March 30, 1926. 1,578,389
E. O. BRANINGTON
SEPARATOR
Filed Feb. 15, 1924
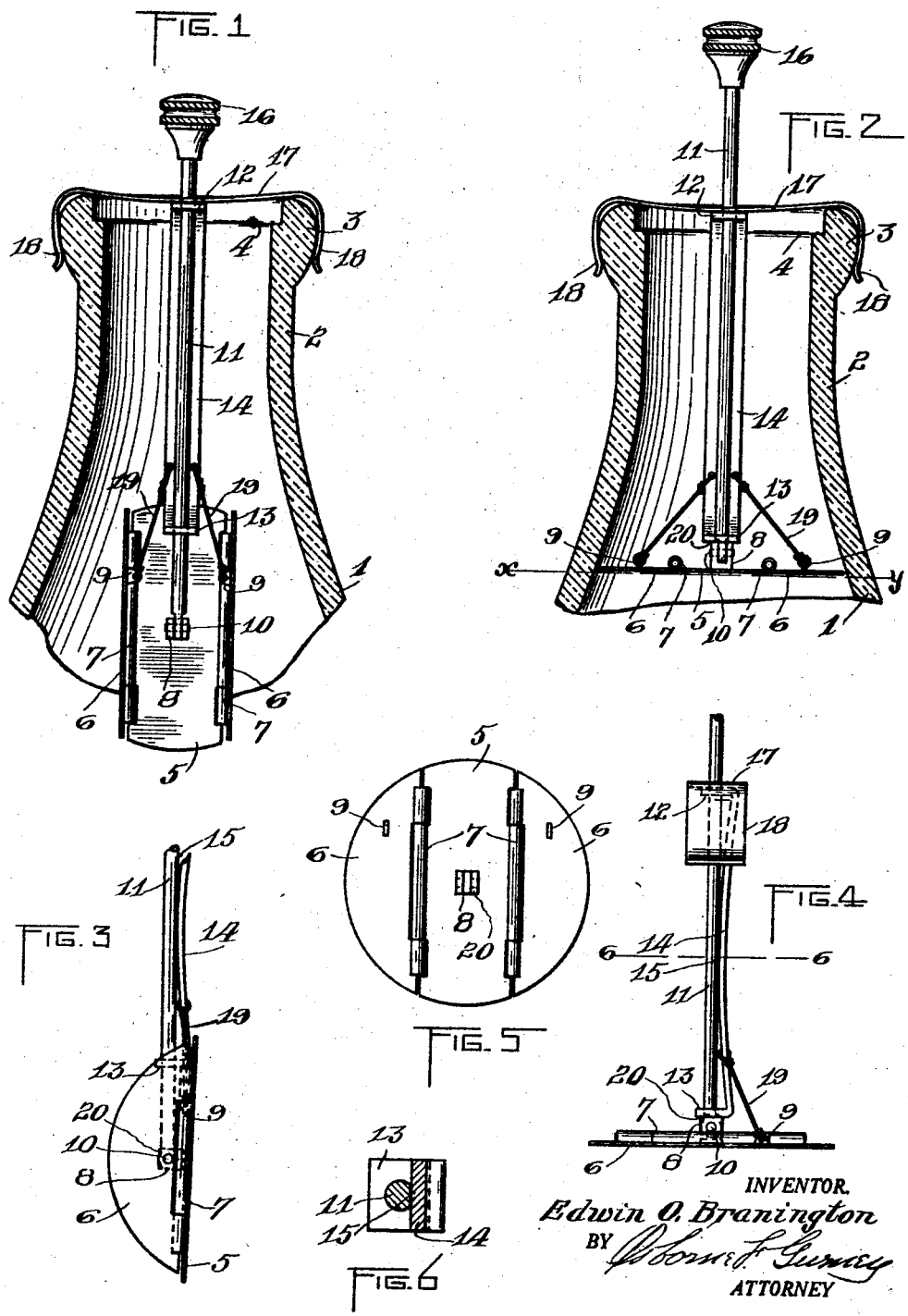

Patented Mar. 30, 1926.

1,578,389

UNITED STATES PATENT OFFICE.

EDWIN O. BRANINGTON, OF ROCHESTER, NEW YORK, ASSIGNOR OF ONE-HALF TO OSCAR A. PETERS, OF ROCHESTER, NEW YORK.

SEPARATOR.

Application filed February 15, 1924. Serial No. 693,141.

*To all whom it may concern:*

Be it known that I, EDWIN O. BRANINGTON, a citizen of the United States of America, and a resident of Rochester, in the county of Monroe and State of New York, have invented a new and Improved Separator, of which the following is a specification.

The present invention relates to separators for use with fluid containers, an object of the invention being to provide a device of this character having a collapsible part insertable through the neck of a filled container without agitating the fluid and which, through a connection operable from the exterior of the container, is opened to form a separator or partition plate between the two parts of the fluid to be separated, that is, when one part is a cream or scum which rises to the surface of the other part.

The invention relates more particularly to cream separators and the embodiment thereof herein shown and described is intended for use with milk bottles such as are now commonly employed by dealers in the distribution of milk for household use, another object of the invention being to provide a device readily attachable to a bottle and having a collapsible part insertable through the bottle neck, which part, when opened, forms a separator plate at substantially the dividing line between the milk and the cream and permits the cream being poured off without disturbing the milk, this separator plate having an area substantially that of the bottle in the plane in which the plate lies and which may be greater than the mouth of the bottle.

A further object of the invention is to provide a device having a separator plate formed of a plurality of hingedly connected sections which are foldable and otherwise angularly movable so as to be inserted edgewise through the neck of the bottle and having a connecting means operable from the exterior of the bottle and detachably supported on the rim at the mouth thereof whereby such plate sections are caused to move into a common plane transversely of the bottle and thus form a partition at the line of separation between milk and cream.

And, a still further object of the invention is to provide a separator of the character described for household use that is of simple, inexpensive and sanitary construction, consisting of but few parts, and which is readily attached and removed from a milk bottle.

To these and other ends the invention consists of certain parts and combinations of parts as will be fully set forth in the following description and particularly defined in the appended claims.

The accompanying drawings illustrating a preferred embodiment of the invention are as follows:

Figure 1 shows the device in front elevation and inserted in a milk bottle with the separator plate sections in folded position, the fragmentary portion of the bottle being shown in longitudinal central section.

Fig. 2 is a view similar to Fig. 1 but with the plate sections opened to operative position.

Fig. 3 is a side view of the lower portion of the separator as seen in Fig. 1.

Fig. 4 is a view similar to Fig. 3 of the separator but with the plate sections opened out as in Fig. 2.

Fig. 5 is a top view of the separator plate in open position.

And, Fig. 6 is an enlarged sectional detail of the operating rod and guide therefor taken on the line 6—6, Fig. 4.

Similar reference numerals refer to similar parts throughout the several views.

In the drawings the numeral 1 represents a fluid container which, in this instance, is a milk bottle formed with a neck 2, a reinforcing bead 3 around its mouth and a seat 4 for the usual paper closure cap, not shown. In bottles of this type, if the milk be of standard grade, the dividing line between milk and cream is substantially as indicated at $x-y$, Fig. 2, the inner diameter of the bottle at this line being greater than that of the neck 2, and this invention provides a separator whereby the cream may be poured off and the milk retained in the bottle, the device comprising a foldable separator plate which, when opened lies substantially in the plan of the line $x-y$, an operating rod, a guide for the rod and a support for the guide attachable to the bottle rim 3.

The separator plate is circular and formed of a center section 5 and segmental side sections 6 hingedly connected at 7 to parallel side edges of the center section, this center section being provided at its center with an upstanding bifurcated lug 8 while on each segmental section 6, off center with respect to the lug 8, is an ear 9.

Having pivotal connection at 10 with the lug 8 is the lower end of an operating rod 11 which is guided for axial movment in the perforated laterally turned ends 12 and 13 of a guide bar, the body portion 14 of which is bowed inwardly to engage the flattened surface 15 of the operating rod, thus acting as a brake or drag to prevent too free a movement of the rod and also holding the rod against rotation. The rod 11 at its outer end is provided with any suitable finger engaging knob 16, and the end portion 12 of the guide bar is secured in any preferred manner, as by solder, to the bar supporting member which, in this instance, is a strip of spring metal 17 having its ends bent to form spring clips 18 which yieldingly engage over the rim 3 at the mouth of the bottle, this strip 17 extending across the mouth of the bottle and being of such width as not to interfere with pouring off of the cream.

Associated with the rod 11 for effecting an opening and closing of the plate sections are links 19 which, in this instance, are wires having loop connection at their upper ends with the body portion 14 of the guide bar and at their lower ends similar connection with the ears 9 on the segmental sections 6, these links, when the plate is opened, extending in rear of the pivotal connection 10 and preferably at substantially forty-five degrees to the plane of the plate, while the lug 8, when the plate is opened, abuts the under side of the laterally extending guide portion 13 and has a flat engaging surface 20 so as to hold the plate at right angles to the rod 11.

When using the device, it is inserted into the neck 2 of the bottle with the separator plate in collapsed or folded condition, as indicated in Figs. 1 and 3, and the spring clips 18 of the supporting strip 17 sprung over the rim 3. The rod 11 is then drawn outwardly by engaging the finger piece 16 and during this movement the plate member is carried upwardly or outwardly and at the same time due to the resultant swing rearwardly of the links 19, is caused to turn about the axis 10 to lie in a plane at right angles to the rod 11 at the time the surface 20 of the stop lug 8 engages the guide part 13, while the simultaneous outward swing of the links 19 causes the segmental sections 6 to turn about their hinge connections 7 and lie in the plane of the center plate section 5.

In order to remove the separator from the bottle, and before disengagement of the clip members 18, the rod 11 is moved inwardly, thus causing the links 19 to swing forwardly and inwardly which effects a relative movement of the segmental plate sections 6 and the center section 5 to occupy the folded position with the center section 5 lying substantially parallel with the rod 11 and the side sections 6 folded inwardly at right angles to the center section.

From the foregoing it is believed that the construction and manner of using the separator have been made sufficiently clear to call for no further explanation.

What I claim is:—

1. A device of the character described comprising, in combination, a foldable separator plate formed of three hingedly connected sections, an operating rod having pivotal connection with the center one of said sections, a guide on which said operating rod is axially movable, a support for said guide, and links connected to the other of said sections and to said guide, said links being the means for effecting turning of the center section about its pivotal connection and swinging of the side sections about their hinged connections on axial movement of the operating rod.

2. A device of the character described comprising, in combination, a foldable circular separator plate formed of a center section and segmental side sections hingedly connected to the center section, an operating rod having pivotal connection with the center section, a guide on which said operating means is axially movable, a support for said guide, and links connected to said side sections and said guide, said links being the means for turning the center section about its pivotal connection and swinging of the side sections about their hinged connections on movement of the operating rod.

3. A device of the character described comprising, in combination, a foldable circular separator plate formed of a center section and segmental side sections hingedly connected to the center section, an operating rod having pivotal connection with the center section, a guide on which said operating rod is axially movable, a support for said guide, and links connected to said side sections and said guide, the link connections with the side sections being off center with respect to the pivotal connection of said operating means.

4. The combination, in a device of the character described, of a guide, an operating rod axially movable on said guide, a support for the guide, a separator plate formed of a center section and side sections hingedly connected to the center section, the center section being pivotally connected to said rod, the center section and side sections normally lying substantially parallel with said rod and the side sections at substantially right angles to the center section, link connections between said side sections and said guide for effecting on outward movement of said rod a turning of the center section about its pivotal connection and a swinging of the side sections into the plane of the center section, and co-operating means on the center section and the guide for limiting both angular movement of the center section and outward movement of the rod.

5. The combination, in a device of the character described, of a supporting strip for extending across the mouth of a milk bottle, spring clips on said strip for engaging over a rim on said bottle, a guide bar secured to said strip for extending into the neck of the bottle, an operating rod longitudinally movable on said guide bar, a separator plate formed of a center section and segmental side sections hingedly connected to the center section, such center section having pivotal connection with the inner end of said rod, and links connecting said side sections with said guide bar, for the purpose set forth.

6. The combination, in a device of the character described, of a supporting strip for extending across the mouth of a milk bottle, spring clips on said strip for engaging over a rim on said bottle, a guide bar secured to said strip for extending into the bottle and comprising an inwardly curved body portion and perforated laterally extending end portions, an operating rod axially movable in said laterally extending portions and having a flattened surface in contact with said curved guide portion, a separator plate formed of a center section and segmental side sections hingedly connected to the center section, such center section having pivotal connection with the inner end of said rod, and links connecting said side sections with said guide bar, said inner lateral portion of the guide bar and said center plate section co-operating to limit outward movement of said rod, when the plate sections have been moved to operative position.

EDWIN O. BRANINGTON.